United States Patent
Motoi

(10) Patent No.: US 10,522,837 B2
(45) Date of Patent: Dec. 31, 2019

(54) LEAD-ACID BATTERY

(71) Applicant: GS Yuasa International Ltd., Kyoto-shi, Kyoto (JP)

(72) Inventor: Ikumi Motoi, Kyoto (JP)

(73) Assignee: GS Yuasa International Ltd., Kyoto (JP)

( * ) Notice: Subject to any disclaimer, the term of this patent is extended or adjusted under 35 U.S.C. 154(b) by 89 days.

(21) Appl. No.: 15/039,334

(22) PCT Filed: Nov. 21, 2014

(86) PCT No.: PCT/JP2014/005866
§ 371 (c)(1),
(2) Date: May 25, 2016

(87) PCT Pub. No.: WO2015/079668
PCT Pub. Date: Jun. 4, 2015

(65) Prior Publication Data
US 2017/0025681 A1    Jan. 26, 2017

(30) Foreign Application Priority Data

Nov. 29, 2013 (JP) ................................ 2013-247061

(51) Int. Cl.
*H01M 4/62* (2006.01)
*H01M 2/16* (2006.01)
(Continued)

(52) U.S. Cl.
CPC .......... *H01M 4/628* (2013.01); *H01M 2/162* (2013.01); *H01M 2/1613* (2013.01); *H01M 4/21* (2013.01);
(Continued)

(58) Field of Classification Search
CPC .. H01M 4/628; H01M 2/1606; H01M 2/1613; H01M 2/162; H01M 4/14;
(Continued)

(56) References Cited

U.S. PATENT DOCUMENTS 4,336,314 A * 6/1982 Yonezu ............... H01M 2/0242
429/145
4,725,516 A * 2/1988 Okada ................. H01M 10/342
429/204

(Continued)

FOREIGN PATENT DOCUMENTS

JP   60091572 A2   5/1985
JP   4104476 A2    4/1992
(Continued)

OTHER PUBLICATIONS

International Search Report dated Dec. 16, 2014 filed in PCT/JP2014/005866.

*Primary Examiner* — Wojciech Haske
(74) *Attorney, Agent, or Firm* — Rankin, Hill & Clark LLP

(57) ABSTRACT

A lead-acid battery includes a separator retaining an electrolyte solution, a positive electrode plate, a negative electrode plate, and a container. A negative electrode material contains bisphenols condensate, and a theoretical capacity ratio of the negative electrode material to a positive electrode material is 0.85 or more and 1.2 or less.

9 Claims, 1 Drawing Sheet

(51) Int. Cl.
*H01M 4/21* (2006.01)
*H01M 4/38* (2006.01)
*H01M 10/08* (2006.01)
*H01M 10/42* (2006.01)

(52) U.S. Cl.
CPC ............. *H01M 4/38* (2013.01); *H01M 4/622* (2013.01); *H01M 4/625* (2013.01); *H01M 10/08* (2013.01); *H01M 2010/4292* (2013.01)

(58) Field of Classification Search
CPC ............ H01M 4/21; H01M 4/38; H01M 4/62; H01M 4/622; H01M 4/625; H01M 10/06; H01M 10/08; H01M 2010/4292
See application file for complete search history.

(56) References Cited

U.S. PATENT DOCUMENTS

| | | |
|---|---|---|
| 5,547,783 A | 8/1996 | Funato |
| 2013/0157118 A1 | 6/2013 | Shibahara et al. |
| 2013/0280595 A1 | 10/2013 | Kogure |
| 2014/0212765 A1 | 7/2014 | Harada |
| 2015/0050540 A1 | 2/2015 | Toduka et al. |

FOREIGN PATENT DOCUMENTS

| | | |
|---|---|---|
| JP | 7201331 A2 | 8/1995 |
| JP | 8329975 A2 | 12/1996 |
| JP | 10092421 A2 | 4/1998 |
| JP | 11250913 A2 | 9/1999 |
| JP | 11339843 A2 | 12/1999 |
| JP | 2001023620 A2 | 1/2001 |
| JP | 2001176539 A2 | 6/2001 |
| JP | 2002175785 A2 | 6/2002 |
| JP | 2003163027 A2 | 6/2003 |
| JP | 2003346887 A2 | 12/2003 |
| JP | 2006049025 A2 | 2/2006 |
| JP | 5083481 | 11/2012 |
| JP | 2013041848 A2 | 2/2013 |
| JP | 2013161606 A1 | 8/2013 |
| WO | 2011077640 A1 | 6/2011 |
| WO | 2012157311 A1 | 11/2012 |
| WO | 2013054467 A1 | 4/2013 |

* cited by examiner

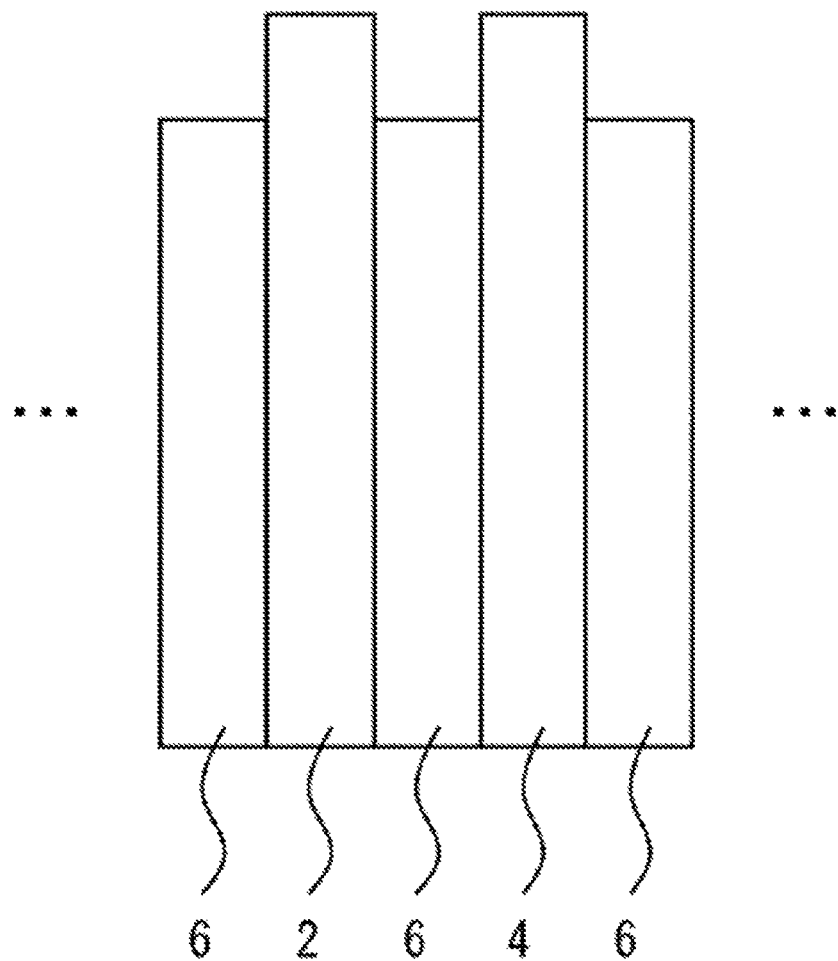

LEAD-ACID BATTERY

TECHNICAL FIELD

The present invention relates to a lead-acid battery in which a negative active material contains bisphenols condensate.

BACKGROUND ART

In a retainer type lead-acid battery, a retainer such as a mat-like separator retains an electrolyte solution, and oxygen and hydrogen generated during charging of the lead-acid battery are returned to water by gas recombination. Patent Document 1 discloses that in a retainer type lead-acid battery, accumulation of lead sulfate in a negative electrode material easily proceeds when a ratio of a theoretical capacity of the negative electrode material to a theoretical capacity of a positive electrode material is set to less than 1. Further, Patent Document 1 discloses that the accumulation of lead sulfate can be suppressed to improve life performance by including 0.4% by mass or more of carbon in the negative electrode material.

Patent Document 2 discloses to make a negative active material (negative electrode material) of the retainer type lead-acid battery contain bisphenol/aminobenzenesulfonic acid/formaldehyde condensate and flake graphite. Patent Document 2 discloses that the bisphenols condensate is an expander of the negative active material and more improves charge acceptance than lignin which is an existing expander. Further, Patent Document 2 discloses that the bisphenols condensate reduces a hydrogen overvoltage, but when a storage battery is used in a partial state of charge (PSOC), a problem does not arise since generation of hydrogen does not occur. Moreover, Patent Document 2 discloses that flake graphite is a carbon-based electrical conductive material which improves charge acceptance of the negative active material.

PRIOR ART DOCUMENTS

Patent Documents

Patent Document 1: JP-A-07-201331
Patent Document 2: JP-B1-5083481

SUMMARY OF THE INVENTION

Problems to be Solved by the Invention

Patent Document 1 proposes that the negative electrode material of the retainer type lead-acid battery contains a large amount of carbon; however, in accordance with a reproductive experiment by the present inventor, it becomes clear that when the negative electrode material contains a large amount of carbon, the hydrogen overvoltage is reduced and the electrolyte solution decrease becomes significant. Therefore, the present inventor studied suppressing accumulation of lead sulfate in the negative electrode material without an increase of a carbon amount. Consequently, the present inventor found that the bisphenols condensate is effective for preventing the accumulation of lead sulfate in the negative electrode material.

However, as disclosed in Patent Document 2, the bisphenols condensate has a problem of reducing a hydrogen overvoltage of the negative electrode. In the retainer type lead-acid battery in which water addition cannot be performed, this is a decisive problem.

A basic object of the present invention is to suppress accumulation of lead sulfate on the negative electrode in a retainer type lead-acid battery in which the electrode material of the negative electrode contains bisphenols condensate.

Further, another object of the present invention is to minimize the influence of the electrolyte solution decrease.

Means for Solving the Problems

A lead-acid battery according to the present invention includes a separator retaining an electrolyte solution, a positive electrode plate, a negative electrode plate, and a container, wherein a negative electrode material of the negative electrode plate contains bisphenols condensate, and a theoretical capacity ratio of the negative electrode material to a positive electrode material of the positive electrode plate is 0.85 or more and 1.2 or less.

The separator of a retainer or the like may be made of granular silica or silica gel; however, a mat-like separator whose pore size is easily controlled is preferably employed. While the mat-like separator is in the form of a mat made of glass fibers or synthetic resin fibers, a nonwoven fabric-like separator may be employed. Further, when, for example, a median pore size of the separator is 3 μm or more and 8 μm or less in a state where a compression force of about 30 to 50 kg/dm$^2$ is applied to the separator retaining an electrolyte solution in container, the negative electrode can retain a relatively large amount of the electrolyte solution even if the negative electrode has large pore size and is hard to retain the electrolyte solution. Accordingly, even when the electrolyte solution decrease occurs, the influence on characteristics of the lead-acid battery can be reduced.

The negative electrode material preferably contains bisphenols condensate in an amount of 0.05% by mass or more and 0.25% by mass or less. The bisphenols condensate in the negative electrode material has a main effect in that
 the condensate suppresses accumulation of lead sulfate in the negative electrode material, but
 it reduces a hydrogen overvoltage to cause an electrolyte solution decrease.

When a concentration of the bisphenols condensate in the negative electrode material is less than 0.05% by mass, the effect of preventing the accumulation of lead sulfate is insufficient, and when the concentration is more than 0.25% by mass, the electrolyte solution decrease becomes significant.

Particularly preferably, the negative electrode plate retains 15% by mass or more of the total amount of an electrolyte solution, and specifically the negative electrode plate retains 15% by mass or more and 25% by mass or less.

As shown in Table 1 to Table 4, bisphenols condensate can reduce the accumulation of the lead sulfate than lignin which is a similar compound used in Patent Document 1, and the condensate eliminates the necessity for the negative electrode material to contain a large amount of carbon. Next, the amount of the electrolyte solution decrease depends on a theoretical capacity ratio of the negative electrode material to the positive electrode material. As shown in Table 1 to Table 4, the amount of the electrolyte solution decrease becomes smaller in the theoretical capacity ratio range of 0.85 or more and 1.2 or less, particularly 0.9 or more and 1.2 or less, and an accumulation amount of lead sulfate also decreases in this range. When the theoretical capacity ratio is less than 0.85, since the positive electrode material is excessive, the amount of a generated oxygen gas increases and an oxygen absorption reaction in the negative electrode increases, and therefore the accumulation of lead sulfate is thought to proceed. When the theoretical capacity ratio is more than 1.2, since the negative electrode material is excessive, the electrolyte solution decrease easily proceeds and simultaneously reduction of the negative electrode material retards, and therefore the accumulation of lead sulfate is thought to proceed.

In the present specification, it is assumed that the plate is composed of a current collector such as a grid and an electrode material, and the electrode material may be referred to as an active material. Further, the theoretical capacity ratio is a ratio of a theoretical electric capacity obtained from a lead component Pb in the negative electrode material to a theoretical electric capacity obtained from a lead component $PbO_2$ in the positive electrode material. When the theoretical capacity of the positive electrode is denoted by A and the theoretical capacity of the negative electrode is denoted by B, the theoretical capacity ratio is represented by B/A. In order to measure the theoretical capacity ratio, for example, the storage battery is disassembled, the positive electrode plate and the negative electrode plate are washed with water and dried, and the current collector such as a grid is separated from the electrode material. Then, if necessary, components, such as carbon and barium sulfate, other than the active material are removed from and the active material is extracted from the electrode material. Then, the amount of lead sulfate in the active material is measured, a mass in the case where all active materials are lead or lead dioxide is calculated. Based on the calculated mass, theoretical capacities A and B of the positive electrode and the negative electrode, respectively, are calculated to determine a theoretical capacity ratio B/A. In addition, the theoretical capacity is one obtained by multiplying a theoretical capacity per one plate by the number of plates. In measurement of the theoretical capacity ratio, contained materials such bisphenols condensate, carbon and barium sulfate are not included in the active material.

The bisphenols condensate is a condensation product of a bisphenol compound having a sulfone group introduced therein and formaldehyde. the bisphenol compound may be any of bisphenols A, F, S and the like. The bisphenols condensate may have an amino group or the like, but bisphenols condensate not having the amino group is used in Examples. Moreover, in the present invention, it is acceptable to use the bisphenols condensate in combination with, for example, 0.2% by mass or less of lignin (lignin sulfonic acid). In order to measure a concentration of the bisphenols condensate or the like in the electrode material, the storage battery is disassembled, a negative electrode material is taken out of the negative electrode plate, washed with water and dried, and a dried mass of the electrode material is measured. When the electrode material includes lead sulfate, an amount of lead sulfate is measured and converted to the amount of lead or lead dioxide. Next, the negative electrode material is immersed in a strong alkali aqueous solution, for example, at 50° C. for 24 hours, and the content of the bisphenols condensate is measured from UV absorption spectrum of the aqueous solution used for immersion.

Even though the theoretical capacity ratio of the negative electrode to the positive electrodes is optimized and the concentration of the bisphenols condensate is optimized, it is difficult to prevent the electrolyte solution decrease completely. Thus, the negative electrode plate is adapted to retain a required amount of the electrolyte solution even when the electrolyte solution decrease occurs by optimizing the pore size of the mat-like separator. The median pore size of the negative electrode is about 2 µm or more and 3 µm or less immediately after formation, but it increases to 5 µm or more and 8 µm or less after using the lead-acid battery. On the other hand, the median pore size of the positive electrode is 0.01 µm or more and 3 µm or less after the start of use. In contrast with this, the mat-like separator often has a pore size of about 1 to 3 µm in a compressed state, and an order of the pore size becomes negative electrode>separator≥positive electrode. Here, considering a capillary action of the electrolyte solution, the order of retaining the electrolyte solution becomes negative electrode<mat-like separator≤positive electrode, and therefore the influence of the electrolyte solution decrease is maximized at the negative electrode. Thus, when the median pore size of the mat-like separator is set to 3 µm or more and 8 µm or less, an amount of an electrolyte solution retained in the negative electrode after the electrolyte solution decrease can be increased to decrease the influence of the electrolyte solution decrease. In addition, the pore size in a state in which a compression force is applied in the container is important. Further, the pore size has a distribution, and therefore a median in the pore size distribution is used. The median is a value below and above which volumes of the pores having pore sizes are the same.

The pore size in a state in which a compression force is applied is measured, for example, in the following manner. The state of pore sizes and the like is previously observed with a microscope or the like before water washing and drying after disassembling a storage battery. Then, a separator thickness after being compressed is estimated from thicknesses of the positive electrode plate and the negative electrode plate, and an inside dimension of the container. A piece which is as small as it can be set in a sample tube in a mercury intrusion method was cut out from the separator after water washing and drying. Then, compression is applied to the piece with a jig made of a material with no voids such as metal or the like so that the separator has the estimated thickness, and a pore size is measured by a mercury intrusion method.

As is apparent from Table 2 and Table 3, if the median pore size of the mat-like separator is 3 µm or more and 8 µm or less, the negative electrode plate can retain 15% or more of the electrolyte solution. Thus, the negative electrode plate is adapted to retain 15% by mass or more and, for example, 25% by mass or less of a total amount of the electrolyte solution.

In order to measure an amount of the electrolyte solution retained, for example, portions where a separator is not attached to the positive and the negative electrode plates are selected from a disassembled storage battery, and separated into a positive electrode plate, a negative electrode plate and a separator, and a mass of each of separated portions is weighed. In addition, disassembling of the storage battery is performed in a fully charged state. The fully charged state is a state within 24 hours after charging the storage battery until a voltage per a cell reaches 2.4 V or more. The positive electrode plate, the negative electrode plate, and the separator are washed with water and dried, and a mass of each of them is measured again, and then a value obtained by subtracting this mass from the mass measured before water washing and drying is defined as the amount of an electrolyte solution retained.

BRIEF DESCRIPTION OF THE DRAWINGS

FIG. 1 is a side view of a main part of a retainer type lead-acid battery of Examples.

MODE FOR CARRYING OUT THE INVENTION

Hereinafter, an optimum example of the present invention will be described. In embodying the present invention, the example can be appropriately modified according to common sense of those skilled in the art and disclosure of the prior art.

Examples

A negative electrode material containing a lead powder, bisphenols condensate (formaldehyde condensate of bisphenol A having a sulfone group introduced therein), carbon black, barium sulfate and synthetic resin fibers was formed into a paste with sulfuric acid, and the resulting paste was filled into a negative current collector made of a Pb—Ca—Sn-based expanded grid, dried and cured to form an unformed negative electrode plate. Similarly, a positive electrode material containing a lead powder and synthetic resin fibers was formed into a paste with sulfuric acid, and the resulting paste was filled into a positive current collector made of a Pb—Ca—Sn-based expanded grid, dried and cured to form an unformed positive electrode plate. Further, a total thickness of the positive electrode plate and the negative electrode plate was kept constant, and the theoretical capacity ratio of the negative electrode material to the positive electrode material was varied in a range of 0.8 to 1.25 by adjusting the amounts of the positive active material and the negative active material so as to be an intended theoretical capacity ratio.

Four kinds of mat-like separators, whose medians of the pore size distribution were 1 μm or more and less than 3 μm, 3 μm or more and less than 5 μm, 5 μm or more and less than 8 μm, and 8 μm or more in a state in which compression was applied, were prepared. The pore size was adjusted by varying a density of the glass fiber or the synthetic resin fiber to be used for a separator.

Using four negative electrode plates and five positive electrode plates, the mat-like separator was sandwiched between the plates and housed in a container in a state in which compression was applied, and sulfuric acid having a specific gravity of 1.25 was added to perform formation in container to produce a retainer type lead-acid battery. A structure of the retainer type lead-acid battery is schematically shown in FIG. 1, and a reference numeral 2 indicates a negative electrode plate, 4 indicates a positive electrode plate, and 6 indicates a separator.

Retainer type lead-acid batteries (theoretical capacity ratio: 1.0 and 0.85) of comparative examples were produced in the same manner as in examples described above except for preparing a negative active material paste which contains lignin in place of bisphenols condensate, contains carbon black, barium sulfate and synthetic resin fibers, and is predominantly composed of a lead powder.

On three of each type of the lead-acid battery, a life cycle test composed of a cycle of 4 minutes discharge at 1 CA and 10 minutes charge at a constant voltage of 2.47 V (maximum current 1 CA) was performed according to JIS D 5302, and the number of life cycles was measured using one of tested storage batteries. Another one storage battery was fully charged after a lapse of 7200 cycles, and disassembled, and a ratio in which the lead in the negative active material was changed to lead sulfate and the amount of the electrolyte solution decrease were measured. In addition, if a life cycle was shorter than 7200 cycles, measurement was performed at the time of the life. Moreover, remaining one storage battery was fully charged and disassembled before a life test, and based on the masses of the positive electrode plate, the negative electrode plate and the mat-like separator measured before water washing and drying and the masses of the positive electrode, the negative electrode plate and the mat-like separator measured after water washing and drying, rates of the electrolyte solutions retained in them were determined.

These measurement results are shown in Table 1 to Table 9. The accumulation amount of lead sulfate could be reduced significantly by using the bisphenols condensate in place of lignin. Then, when the theoretical capacity ratio of the negative electrode material to the positive electrode material was 0.85 or more and 1.2 or less, preferably 0.9 or more and 1.2 or less, the accumulation of lead sulfate could be suppressed and the amount of the electrolyte solution decrease could be reduced. Moreover, when the median pore size of the mat-like separator was 3 μm or more and 8 μm or less, a rate at which the negative electrode plate retains the electrolyte solution can be increased, and the number of life cycles was remarkably increased. Further, when the negative electrode plate retains 15% by mass or more of the total amount of an electrolyte solution, the number of life cycles increased remarkably. By using bisphenols condensate, adjusting the theoretical capacity ratio of the negative electrode material to the positive electrode material appropriately, and adjusting the median pore size of the mat-like separator to 3 μm or more and 8 μm or less, a retainer type lead-acid battery was obtained in which accumulation of the lead sulfate was low, an amount of the electrolyte solution decrease was small, and the number of cycles repeated until reaching a life was large.

TABLE 1

| | Expander, carbon | | | | | | | | |
|---|---|---|---|---|---|---|---|---|---|
| | Bisphenols 0.2% + Carbon 0.3% | | | | | | | Lignin 0.2% + Carbon 1.0% | Lignin 0.2% + Carbon 0.3% |
| Separator Pore Size at the Time of Compression | 1-3 μm | | | | | | | | |
| −/+Theoretical Capacity Ratio | 0.80 | 0.85 | 0.90 | 1.00 | 1.10 | 1.20 | 1.25 | 0.85 | 1.00 |
| Lead Sulfate Amount in Negative Electrode/% | 35 | 28 | 25 | 25 | 24 | 24 | 28 | 37* | 35* |
| Amount of Electrolyte Solution Decrease/% | 24 | 22 | 20 | 20 | 21 | 23 | 30 | 35* | 32* |
| Distribution of Electrolyte Positive Electrode | 30 | — | — | 28 | — | — | 26 | — | — |

TABLE 1-continued

| | | Expander, carbon | | | | | | | | |
|---|---|---|---|---|---|---|---|---|---|---|
| | | Bisphenols 0.2% + Carbon 0.3% | | | | | | | Lignin 0.2% + Carbon 1.0% | Lignin 0.2% + Carbon 0.3% |
| Solution | Separator | 60 | — | — | 60 | — | — | 60 | — | — |
| Amount | Negative Electrode | 10 | — | — | 12 | — | — | 14 | — | — |
| Number of Life Cycles | | 5760 | 6240 | 7200 | 8160 | 7680 | 7200 | 5760 | 4800 | 5760 |

*If a life cycle is shorter than 7200 cycles, a value at the time of the life is shown.

TABLE 2

| | | Expander, carbon | | | | | | | | |
|---|---|---|---|---|---|---|---|---|---|---|
| | | Bisphenols 0.2% + Carbon 0.3% | | | | | | | Lignin 0.2% + Carbon 1.0% | Lignin 0.2% + Carbon 0.3% |
| Separator Pore Size at the Time of Compression | | 3-5 μm | | | | | | | | |
| −/+Theoretical Capacity Ratio | | 0.80 | 0.85 | 0.90 | 1.00 | 1.10 | 1.20 | 1.25 | 0.85 | 1.00 |
| Lead Sulfate Amount in Negative Electrode/% | | 23 | 19 | 16 | 15 | 15 | 16 | 20 | 38* | 35* |
| Amount of Electrolyte Solution Decrease/% | | 18 | 16 | 16 | 15 | 16 | 16 | 18 | 34* | 35* |
| Distribution of Electrolyte Solution Amount | Positive Electrode | 40 | — | — | 38 | — | — | 36 | — | — |
| | Separator | 45 | — | — | 45 | — | — | 45 | — | — |
| | Negative Electrode | 15 | — | — | 17 | — | — | 19 | — | — |
| Number of Life Cycles | | 10560 | 12480 | 13920 | 14400 | 14400 | 13920 | 12480 | 5280 | 6240 |

TABLE 3

| | | Expander, carbon | | | | | | | | |
|---|---|---|---|---|---|---|---|---|---|---|
| | | Bisphenols 0.2% + Carbon 0.3% | | | | | | | Lignin 0.2% + Carbon 1.0% | Lignin 0.2% + Carbon 0.3% |
| Separator Pore Size at the Time of Compression | | 5-8 μm | | | | | | | | |
| −/+Theoretical Capacity Ratio | | 0.80 | 0.85 | 0.90 | 1.00 | 1.10 | 1.20 | 1.25 | 0.85 | 1.00 |
| Lead Sulfate Amount in Negative Electrode/% | | 36 | 30 | 23 | 20 | 21 | 22 | 28 | 37* | 38* |
| Amount of Electrolyte Solution Decrease/% | | 23 | 21 | 19 | 18 | 18 | 23 | 25 | 36* | 37* |
| Distribution of Electrolyte Solution Amount | Positive Electrode | 42 | — | — | 40 | — | — | 38 | — | — |
| | Separator | 40 | — | — | 40 | — | — | 40 | — | — |
| | Negative Electrode | 18 | — | — | 20 | — | — | 22 | — | — |
| Number of Life Cycles | | 10080 | 12000 | 13440 | 13920 | 13920 | 13440 | 12000 | 5280 | 6240 |

TABLE 4

| | | Expander, carbon | | | | | | | | |
|---|---|---|---|---|---|---|---|---|---|---|
| | | Bisphenols 0.2% + Carbon 0.3% | | | | | | | Lignin 0.2% + Carbon 1.0% | Lignin 0.2% + Carbon 0.3% |
| Separator Pore Size at the Time of Compression | | 8-12 μm | | | | | | | | |
| −/+Theoretical Capacity Ratio | | 0.80 | 0.85 | 0.90 | 1.00 | 1.10 | 1.20 | 1.25 | 0.85 | 0.85 |
| Lead Sulfate Amount in Negative Electrode/% | | 40 | 35 | 26 | 24 | 25 | 28 | 30 | 38* | 36* |
| Amount of Electrolyte Solution Decrease/% | | 28 | 26 | 23 | 21 | 22 | 28 | 32 | 34* | 34* |

TABLE 4-continued

| | | Expander, carbon | | | | | | | Lignin 0.2% + Carbon 1.0% | Lignin 0.2% + Carbon 0.3% |
|---|---|---|---|---|---|---|---|---|---|---|
| | | Bisphenols 0.2% + Carbon 0.3% | | | | | | | | |
| Distribution of Electrolyte Solution Amount | Positive Electrode | 50 | — | — | 49 | — | — | 48 | — | — |
| | Separator | 38 | — | — | 38 | — | — | 38 | — | — |
| | Negative Electrode | 12 | — | — | 13 | — | — | 14 | — | — |
| Number of Life Cycles | | 5760 | 8640 | 10560 | 11040 | 10080 | 9120 | 6240 | 4800 | 4800 |

While the content of the bisphenols condensate was 0.2% by mass in Table 1 to Table 4, the content was optional. The results shown in Table 5 to Table 11 were obtained in the same manner as in the above-mentioned Example except for varying the content of the bisphenols condensate. From these Tables, it is found that the content of the bisphenols condensate in the negative electrode material is preferably 0.05% by mass or more and 0.25% by mass or less.

TABLE 5

| Expander, carbon | Bisphenols 0.03% + Carbon 0.3% | | | | | | |
|---|---|---|---|---|---|---|---|
| Separator Pore Size at the Time of Compression | 5-8 μm | | | | | | |
| −/+Theoretical Capacity Ratio | 0.80 | 0.85 | 0.90 | 1.00 | 1.10 | 1.20 | 1.25 |
| Lead Sulfate Amount in Negative Electrode/% | 40 | 34 | 28 | 24 | 25 | 27 | 33 |
| Amount of Electrolyte Solution Decrease/% | 22 | 20 | 18 | 17 | 18 | 21 | 24 |
| Number of Life Cycles | 5760 | 7680 | 8160 | 9120 | 8640 | 7680 | 7200 |

TABLE 6

| Expander, carbon | Bisphenols 0.05% + Carbon 0.3% | | | | | | |
|---|---|---|---|---|---|---|---|
| Separator Pore Size at the Time of Compression | 5-8 μm | | | | | | |
| −/+Theoretical Capacity Ratio | 0.80 | 0.85 | 0.90 | 1.00 | 1.10 | 1.20 | 1.25 |
| Lead Sulfate Amount in Negative Electrode/% | 36 | 30 | 23 | 20 | 21 | 22 | 28 |
| Amount of Electrolyte Solution Decrease/% | 27 | 25 | 23 | 22 | 22 | 26 | 30 |
| Number of Life Cycles | 7200 | 8640 | 9120 | 10560 | 10080 | 9120 | 8640 |

TABLE 7

| Expander, carbon | Bisphenols 0.1% + Carbon 0.3% | | | | | | |
|---|---|---|---|---|---|---|---|
| Separator Pore Size at the Time of Compression | 5-8 μm | | | | | | |
| −/+Theoretical Capacity Ratio | 0.80 | 0.85 | 0.90 | 1.00 | 1.10 | 1.20 | 1.25 |
| Lead Sulfate Amount in Negative Electrode/% | 37 | 32 | 24 | 21 | 22 | 24 | 29 |
| Amount of Electrolyte Solution Decrease/% | 23 | 21 | 18 | 18 | 17 | 23 | 25 |
| Number of Life Cycles | 8640 | 10080 | 10560 | 11040 | 10080 | 10080 | 9120 |

TABLE 8

| Expander, carbon | Bisphenols 0.2% + Carbon 0.3% | | | | | | |
|---|---|---|---|---|---|---|---|
| Separator Pore Size at the Time of Compression | 5-8 μm | | | | | | |
| −/+Theoretical Capacity Ratio | 0.80 | 0.85 | 0.90 | 1.00 | 1.10 | 1.20 | 1.25 |
| Lead Sulfate Amount in Negative Electrode/% | 36 | 30 | 23 | 20 | 21 | 22 | 28 |
| Amount of Electrolyte Solution Decrease/% | 23 | 21 | 19 | 18 | 18 | 23 | 25 |
| Number of Life Cycles | 10080 | 12000 | 13440 | 13920 | 13920 | 13440 | 12000 |

TABLE 9

| Expander, carbon | Bisphenols 0.25% + Carbon 0.3% | | | | | | |
|---|---|---|---|---|---|---|---|
| Separator Pore Size at the Time of Compression | 5-8 μm | | | | | | |
| −/+Theoretical Capacity Ratio | 0.80 | 0.85 | 0.90 | 1.00 | 1.10 | 1.20 | 1.25 |
| Lead Sulfate Amount in Negative Electrode/% | 35 | 29 | 23 | 19 | 20 | 22 | 27 |
| Amount of Electrolyte Solution Decrease/% | 24 | 22 | 20 | 19 | 20 | 25 | 27 |
| Number of Life Cycles | 10080 | 12480 | 13440 | 14400 | 14400 | 13440 | 12480 |

TABLE 10

| Expander, carbon | Bisphenols 0.30% + Carbon 0.3% | | | | | | |
|---|---|---|---|---|---|---|---|
| Separator Pore Size at the Time of Compression | 5-8 μm | | | | | | |
| −/+Theoretical Capacity Ratio | 0.80 | 0.85 | 0.90 | 1.00 | 1.10 | 1.20 | 1.25 |
| Lead Sulfate Amount in Negative Electrode/% | 36 | 30 | 23 | 20 | 21 | 22 | 28 |
| Amount of Electrolyte Solution Decrease/% | 27 | 25 | 23 | 22 | 22 | 26 | 30 |
| Number of Life Cycles | 7200 | 7680 | 8160 | 9120 | 8640 | 8640 | 7680 |

The content of the carbon black in the negative electrode material is preferably 0.1% by mass or more and 1.5% by mass or less, and a kind of the carbon black is optional. The positive electrode material and the negative electrode material may contain additives other than the compounds of the lead-acid batteries shown in Tables 1-10, and may not contain barium sulfate and synthetic resin fibers. Moreover, composition, a structure and the like of the current collector are optional, and a kind of lead powder and conditions of formation are optional.

DESCRIPTION OF REFERENCE SIGNS

2 Negative electrode plate
4 Positive electrode plate
6 Mat-like separator

The invention claimed is:

1. A lead-acid battery comprising a separator retaining an electrolyte solution, a positive electrode plate, a negative electrode plate, and a container,
    wherein a negative electrode material of the negative electrode plate contains bisphenols condensate,
    a theoretical capacity ratio B/A of a theoretical capacity B of the negative electrode material to a theoretical capacity A of a positive electrode material of the positive electrode plate is 0.85 or more and 1.2 or less,
    the separator is a nonwoven fabric-like or mat-like separator made of glass fibers or synthetic resin fibers, and
    a median pore size of the nonwoven fabric-like or mat-like separator is 3 μm or more and 8 μm or less in a state in which a compression force of 30 to 50 kg/dm$^2$ is applied to the nonwoven fabric-like or mat-like separator retaining the electrolyte solution in the container.

2. The lead-acid battery according to claim 1, wherein the negative electrode material further contains carbon black.

3. The lead-acid battery according to claim 2, wherein the negative electrode material contains the carbon black in an amount of 0.1% by mass or more and 1.5% by mass or less.

4. The lead-acid battery according to claim 1, wherein the lead-acid battery is a retainer type lead-acid battery.

5. The lead-acid battery according to claim 1, wherein the negative electrode material contains the bisphenols condensate in an amount of 0.05% by mass or more and 0.25% by mass or less.

6. The lead-acid battery according to claim 1, wherein the bisphenols condensate is bisphenols formaldehyde condensate.

7. The lead-acid battery according to claim 1, wherein the negative electrode plate retains 15% by mass or more of a total amount of the electrolyte solution.

8. The lead-acid battery according to claim 1, wherein the negative electrode plate retains 15% by mass or more and 25% by mass or less of a total amount of the electrolyte solution.

9. The lead-acid battery according to claim 1, wherein the theoretical capacity ratio B/A is 0.9 or more and 1.2 or less.

* * * * *